United States Patent
Brock

(10) Patent No.: US 10,885,522 B1
(45) Date of Patent: *Jan. 5, 2021

(54) UPDATING MERCHANT LOCATION FOR CARDLESS PAYMENT TRANSACTIONS

(71) Applicant: Square, Inc., San Francisco, CA (US)

(72) Inventor: Zachary Brock, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/445,380

(22) Filed: Feb. 28, 2017

Related U.S. Application Data

(63) Continuation of application No. 13/763,504, filed on Feb. 8, 2013, now Pat. No. 9,652,791.

(51) Int. Cl.
  *G06Q 30/00* (2012.01)
  *G06Q 20/40* (2012.01)
  *G06Q 20/32* (2012.01)

(52) U.S. Cl.
  CPC ....... *G06Q 20/401* (2013.01); *G06Q 20/3224* (2013.01)

(58) Field of Classification Search
  CPC .................. G06Q 20/401; G06Q 20/3224
  USPC .............................. 705/26, 27, 44
  See application file for complete search history.

(56) References Cited

U.S. PATENT DOCUMENTS

| | | | |
|---|---|---|---|
| 4,035,614 A | 7/1977 | Frattarola et al. | |
| 4,254,441 A | 3/1981 | Fisher | |
| 4,591,937 A | 5/1986 | Nakarai et al. | |
| 4,845,740 A | 7/1989 | Tokuyama et al. | |
| 5,266,789 A | 11/1993 | Anglin et al. | |
| 5,434,400 A | 7/1995 | Scherzer | |
| 5,463,678 A | 10/1995 | Kepley, III et al. | |

(Continued)

FOREIGN PATENT DOCUMENTS

| | | |
|---|---|---|
| AU | 2017208387 A1 | 8/2017 |
| CA | 2 919 238 A1 | 1/2015 |

(Continued)

OTHER PUBLICATIONS

"Payments without taking out wallet—or phone," Temple, James. San Francisco Chronicle Feb. 5, 2012; Dialog #278966926, 5pgs (Year: 2012).*

(Continued)

*Primary Examiner* — Robert M Pond
(74) *Attorney, Agent, or Firm* — Polsinelli PC

(57) ABSTRACT

A method that includes receiving, from a user device, a request for a listing of merchants; in response to receiving the request for a listing of merchants, sending, to the user device, data describing one or more merchants and respective initial geographic locations of the one or more merchants; receiving, from the user device, a user request for updating a geographic location of a particular merchant in the one or more merchants; sending a request for an updated geographic location to a computing device of the particular merchant; receiving, from the computing device of the particular merchant, data describing an updated geographic location of the particular merchant; and providing, to the user device, data describing the updated geographic location of the particular merchant.

18 Claims, 8 Drawing Sheets

(56) References Cited

U.S. PATENT DOCUMENTS

| | | |
|---|---|---|
| 5,589,855 A | 12/1996 | Blumstein et al. |
| 5,764,742 A | 6/1998 | Howard et al. |
| 5,850,599 A | 12/1998 | Seiderman |
| 5,945,654 A | 8/1999 | Huang |
| 6,006,109 A | 12/1999 | Shin |
| 6,021,944 A | 2/2000 | Arakaki |
| 6,026,375 A | 2/2000 | Hall et al. |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,341,353 B1 | 1/2002 | Herman et al. |
| 6,363,139 B1 | 3/2002 | Zurek et al. |
| 6,374,176 B1 | 4/2002 | Schmier et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,526,275 B1 | 2/2003 | Calvert |
| 6,536,670 B1 | 3/2003 | Postman et al. |
| 6,579,728 B2 | 6/2003 | Grant et al. |
| 6,612,488 B2 | 9/2003 | Suzuki |
| 6,659,344 B2 | 12/2003 | Otto et al. |
| 6,820,062 B1 | 11/2004 | Gupta et al. |
| 6,832,721 B2 | 12/2004 | Fujii |
| 6,850,147 B2 | 2/2005 | Prokoski et al. |
| 6,868,391 B1 | 3/2005 | Hultgren |
| 6,888,443 B2 | 5/2005 | Ritter |
| 6,896,182 B2 | 5/2005 | Sakaguchi |
| 6,898,598 B2 | 5/2005 | Himmel et al. |
| 6,944,782 B2 | 9/2005 | von Mueller et al. |
| 7,003,316 B1 | 2/2006 | Elias et al. |
| 7,149,296 B2 | 12/2006 | Brown et al. |
| 7,207,480 B1 | 4/2007 | Geddes |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,376,433 B1 | 5/2008 | Hose |
| 7,376,583 B1 | 5/2008 | Rolf |
| 7,403,762 B2 | 7/2008 | Morgan et al. |
| 7,409,234 B2 | 8/2008 | Glezerman |
| 7,433,452 B2 | 10/2008 | Taylor et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,620,404 B2 | 11/2009 | Chesnais et al. |
| 7,684,809 B2 | 3/2010 | Niedermeyer |
| 7,708,189 B1 | 5/2010 | Cipriano |
| 7,711,100 B2 | 5/2010 | Dennis |
| 7,793,834 B2 | 9/2010 | Hachey et al. |
| 7,810,729 B2 | 10/2010 | Morley |
| 7,848,765 B2 | 12/2010 | Phillips et al. |
| 7,869,591 B1 | 1/2011 | Nagel et al. |
| 7,896,248 B2 | 3/2011 | Morley |
| 7,918,394 B1 | 4/2011 | Morley, Jr. |
| 7,945,494 B2 | 5/2011 | Williams |
| 8,050,984 B2 | 11/2011 | Bonner et al. |
| 8,090,351 B2 | 1/2012 | Klein |
| 8,135,624 B1 * | 3/2012 | Ramalingam ......... H04W 4/029 705/26.1 |
| 8,231,055 B2 | 7/2012 | Wen |
| 8,376,239 B1 | 2/2013 | Humphrey |
| 8,413,901 B2 | 4/2013 | Wen |
| 8,438,066 B1 | 5/2013 | Yuen et al. |
| 8,509,734 B1 * | 8/2013 | Gupta .................... G06Q 20/04 455/406 |
| 8,554,670 B1 | 10/2013 | Blank et al. |
| 8,684,261 B2 | 4/2014 | Burdett et al. |
| 8,707,319 B2 * | 4/2014 | Nguyen ............. G06Q 20/3224 718/104 |
| 8,750,901 B1 * | 6/2014 | Gupta ................ G06Q 20/3223 455/456.3 |
| 8,766,791 B2 | 7/2014 | Koen et al. |
| 8,777,104 B1 | 7/2014 | Brock et al. |
| 8,967,471 B1 | 3/2015 | Rosenthal et al. |
| 9,055,400 B1 | 6/2015 | Lee |
| 9,113,344 B1 | 8/2015 | Lee |
| 9,204,257 B1 | 12/2015 | Mendelson |
| 9,264,850 B1 | 2/2016 | Lee |
| 9,373,112 B1 | 6/2016 | Henderson et al. |
| 9,407,689 B1 | 8/2016 | Casares et al. |
| 9,451,397 B1 | 9/2016 | Lee |
| 9,652,791 B1 | 5/2017 | Brock |
| 9,730,015 B1 | 8/2017 | Lee |
| 9,767,474 B1 * | 9/2017 | Ramalingam ...... G06Q 30/0601 |
| 9,838,840 B1 | 12/2017 | Lee |
| 9,924,322 B2 | 3/2018 | Post et al. |
| 10,163,148 B1 | 12/2018 | Chatterjee et al. |
| 10,373,151 B1 | 8/2019 | Lee |
| 2001/0001856 A1 | 5/2001 | Gould et al. |
| 2002/0002507 A1 | 1/2002 | Hatakeyarna |
| 2002/0030871 A1 | 3/2002 | Anderson et al. |
| 2002/0049644 A1 | 4/2002 | Kargman |
| 2002/0077974 A1 | 6/2002 | Ortiz |
| 2002/0099648 A1 | 7/2002 | DeVoe et al. |
| 2002/0108062 A1 | 8/2002 | nakajima et al. |
| 2002/0169541 A1 | 11/2002 | Bouve et al. |
| 2002/0198818 A1 | 12/2002 | Scott et al. |
| 2003/0004842 A1 | 1/2003 | Williams et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2003/0194071 A1 | 10/2003 | Ramian |
| 2003/0200180 A1 | 10/2003 | Phelan et al. |
| 2004/0002897 A1 | 1/2004 | Vishik |
| 2004/0012875 A1 | 1/2004 | Wood |
| 2004/0015475 A1 | 1/2004 | Scheepsma |
| 2004/0041911 A1 | 3/2004 | Odagiri et al. |
| 2004/0049451 A1 | 3/2004 | Berardi et al. |
| 2004/0064378 A1 | 4/2004 | Yoshida |
| 2004/0093274 A1 | 5/2004 | Vanska et al. |
| 2004/0093496 A1 | 5/2004 | Colnot |
| 2004/0104268 A1 | 6/2004 | Bailey |
| 2004/0107170 A1 | 6/2004 | Labrou et al. |
| 2004/0127256 A1 | 7/2004 | Goldthwaite et al. |
| 2004/0128256 A1 | 7/2004 | Krouse et al. |
| 2004/0204074 A1 | 10/2004 | Desai |
| 2005/0004757 A1 | 1/2005 | Neeman et al. |
| 2005/0048961 A1 | 3/2005 | Ribaudo et al. |
| 2005/0077870 A1 | 4/2005 | Ha et al. |
| 2005/0159133 A1 | 7/2005 | Hasan et al. |
| 2005/0242173 A1 | 11/2005 | Suzuki |
| 2005/0251440 A1 | 11/2005 | Bednarek |
| 2005/0256782 A1 | 11/2005 | Sands et al. |
| 2005/0266798 A1 | 12/2005 | Moloney et al. |
| 2006/0089909 A1 | 4/2006 | Mcleod et al. |
| 2006/0094481 A1 | 5/2006 | Gullickson |
| 2006/0122902 A1 | 6/2006 | Petrov et al. |
| 2006/0200378 A1 | 9/2006 | Sorensen |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0293968 A1 | 12/2006 | Brice et al. |
| 2007/0030824 A1 | 2/2007 | Ribaudo et al. |
| 2007/0067833 A1 | 3/2007 | Colnot |
| 2007/0072678 A1 | 3/2007 | Dagres |
| 2007/0100651 A1 | 5/2007 | Ramer et al. |
| 2007/0118429 A1 | 5/2007 | Subotovsky |
| 2007/0124211 A1 | 5/2007 | Smith |
| 2007/0138268 A1 | 6/2007 | Tuchman |
| 2007/0150369 A1 | 6/2007 | Zivin |
| 2007/0150414 A1 | 6/2007 | Templeton |
| 2007/0155430 A1 | 7/2007 | Cheon et al. |
| 2007/0221728 A1 | 9/2007 | Ferro et al. |
| 2007/0244778 A1 | 10/2007 | Bailard |
| 2007/0244811 A1 | 10/2007 | Tumminaro |
| 2007/0250623 A1 | 10/2007 | Hickey et al. |
| 2007/0255653 A1 | 11/2007 | Tumminaro et al. |
| 2007/0281689 A1 | 12/2007 | Altman et al. |
| 2007/0282700 A1 | 12/2007 | Masse |

(56) References Cited

U.S. PATENT DOCUMENTS

| | | |
|---|---|---|
| 2007/0299722 A1 | 12/2007 | Stoffelsma et al. |
| 2008/0027815 A1 | 1/2008 | Johnson et al. |
| 2008/0040219 A1 | 2/2008 | Kim et al. |
| 2008/0040274 A1 | 2/2008 | Uzo |
| 2008/0054072 A1 | 3/2008 | Katragadda et al. |
| 2008/0059297 A1 | 3/2008 | Vallier et al. |
| 2008/0059370 A1 | 3/2008 | Sada et al. |
| 2008/0059375 A1 | 3/2008 | Abifaker |
| 2008/0061150 A1 | 3/2008 | Phillips |
| 2008/0084977 A1 | 4/2008 | Nayak et al. |
| 2008/0147507 A1 | 6/2008 | Langhammer |
| 2008/0147564 A1 | 6/2008 | Singhal |
| 2008/0177662 A1 | 7/2008 | Smith et al. |
| 2008/0189170 A1 | 8/2008 | Ramachandra et al. |
| 2008/0195428 A1 | 8/2008 | O'Sullivan |
| 2008/0215380 A1 | 9/2008 | Graeber |
| 2008/0238610 A1 | 10/2008 | Rosenberg |
| 2008/0242278 A1 | 10/2008 | Rekimoto |
| 2008/0249865 A1 | 10/2008 | Angell et al. |
| 2008/0249882 A1 | 10/2008 | Spolar |
| 2008/0249939 A1 | 10/2008 | Veenstra |
| 2008/0277183 A1 | 11/2008 | Huang et al. |
| 2008/0306678 A1 | 12/2008 | Miyawaki |
| 2009/0024533 A1 | 1/2009 | Fernandes et al. |
| 2009/0030885 A1 | 1/2009 | DePasquale et al. |
| 2009/0043696 A1 | 2/2009 | Ornce et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coifing et al. |
| 2009/0119190 A1 | 5/2009 | Realini |
| 2009/0159681 A1 | 6/2009 | Mullen et al. |
| 2009/0166422 A1 | 7/2009 | Biskupski |
| 2009/0171844 A1 | 7/2009 | Olliphant et al. |
| 2009/0210334 A1 | 8/2009 | Russell |
| 2009/0216676 A1 | 8/2009 | Mathur et al. |
| 2009/0287408 A1 | 11/2009 | Gerdes et al. |
| 2009/0298514 A1 | 12/2009 | Ullah |
| 2009/0328052 A1* | 12/2009 | Nguyen .................. G07F 19/20 718/104 |
| 2010/0057503 A1 | 3/2010 | Katz |
| 2010/0063893 A1 | 3/2010 | Townsend |
| 2010/0087144 A1 | 4/2010 | Korenshtein |
| 2010/0125495 A1 | 5/2010 | Smith et al. |
| 2010/0135178 A1 | 6/2010 | Aggarwal et al. |
| 2010/0144375 A1 | 6/2010 | Pfister et al. |
| 2010/0145868 A1 | 6/2010 | Niedermeyer |
| 2010/0184479 A1 | 7/2010 | Griffin |
| 2010/0191653 A1 | 7/2010 | Johnson et al. |
| 2010/0197325 A1 | 8/2010 | Dredge |
| 2010/0243732 A1 | 9/2010 | Wallner |
| 2010/0287250 A1 | 11/2010 | Carlson et al. |
| 2010/0306080 A1 | 12/2010 | Trandal et al. |
| 2010/0328029 A1 | 12/2010 | Kolek |
| 2011/0045840 A1 | 2/2011 | Alizadeh-Shabdiz et al. |
| 2011/0047037 A1 | 2/2011 | Wu |
| 2011/0060600 A1 | 3/2011 | Fox et al. |
| 2011/0063138 A1 | 3/2011 | Berkobin et al. |
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0090124 A1 | 4/2011 | Liu et al. |
| 2011/0137773 A1 | 6/2011 | Davis, III et al. |
| 2011/0137803 A1 | 6/2011 | Willins |
| 2011/0153495 A1 | 6/2011 | Dixon et al. |
| 2011/0161235 A1 | 6/2011 | Beenau et al. |
| 2011/0180601 A1 | 7/2011 | Morley |
| 2011/0198395 A1 | 8/2011 | Chen |
| 2011/0202393 A1 | 8/2011 | DeWakar et al. |
| 2011/0202463 A1 | 8/2011 | Powell |
| 2011/0208612 A1 | 8/2011 | Shader et al. |
| 2011/0213652 A1 | 9/2011 | Gillen et al. |
| 2011/0238476 A1 | 9/2011 | Carr et al. |
| 2011/0238517 A1 | 9/2011 | Ramalingam et al. |
| 2011/0249668 A1 | 10/2011 | Van Milligan et al. |
| 2011/0258120 A1 | 10/2011 | Weiss |
| 2012/0005096 A1 | 1/2012 | Dorsey et al. |
| 2012/0008851 A1 | 1/2012 | Pennock et al. |
| 2012/0012653 A1 | 1/2012 | Johnson et al. |
| 2012/0052874 A1 | 3/2012 | Kumar |
| 2012/0052910 A1 | 3/2012 | Mu et al. |
| 2012/0101942 A1 | 4/2012 | Park |
| 2012/0109781 A1 | 5/2012 | Felt et al. |
| 2012/0115512 A1 | 5/2012 | Grainger et al. |
| 2012/0116861 A1 | 5/2012 | Dobyns |
| 2012/0128089 A1 | 5/2012 | Tsutsui |
| 2012/0130895 A1 | 5/2012 | Granbery et al. |
| 2012/0149390 A1 | 6/2012 | Gravely et al. |
| 2012/0158500 A1 | 6/2012 | Hochstatter et al. |
| 2012/0166267 A1 | 6/2012 | Beatty et al. |
| 2012/0195295 A1 | 8/2012 | Elmaleh |
| 2012/0209686 A1 | 8/2012 | Horowitz et al. |
| 2012/0209773 A1 | 8/2012 | Ranganathan |
| 2012/0235812 A1 | 9/2012 | Maia et al. |
| 2012/0252500 A1 | 10/2012 | Mitsuya et al. |
| 2012/0278150 A1 | 11/2012 | Chen |
| 2012/0278172 A1 | 11/2012 | Mercuri et al. |
| 2012/0296724 A1 | 11/2012 | Faro et al. |
| 2012/0303425 A1 | 11/2012 | Katzin et al. |
| 2012/0310760 A1 | 12/2012 | Phillips et al. |
| 2013/0002840 A1 | 1/2013 | Toney et al. |
| 2013/0024018 A1 | 1/2013 | Chang et al. |
| 2013/0027227 A1* | 1/2013 | Nordstrom ............. G08G 1/202 340/990 |
| 2013/0030931 A1 | 1/2013 | Moshfeghi |
| 2013/0054281 A1 | 2/2013 | Thakkar et al. |
| 2013/0073365 A1 | 3/2013 | Mccarthy |
| 2013/0079037 A1 | 3/2013 | Dobyns |
| 2013/0110659 A1 | 5/2013 | Phillips et al. |
| 2013/0132274 A1 | 5/2013 | Henderson et al. |
| 2013/0144715 A1 | 6/2013 | Kranzley et al. |
| 2013/0157685 A1 | 6/2013 | Young |
| 2013/0185123 A1 | 7/2013 | Krivopaltsev et al. |
| 2013/0191195 A1 | 7/2013 | Carlson et al. |
| 2013/0217332 A1 | 8/2013 | Altman et al. |
| 2013/0217333 A1 | 8/2013 | Sprigg et al. |
| 2013/0226800 A1* | 8/2013 | Patel .................. G06Q 20/3224 705/44 |
| 2013/0238540 A1 | 9/2013 | O'Donoghue et al. |
| 2013/0268378 A1* | 10/2013 | Yovin .................. G06Q 20/204 705/18 |
| 2013/0282438 A1 | 10/2013 | Hunter et al. |
| 2013/0297422 A1 | 11/2013 | Hunter et al. |
| 2013/0304898 A1 | 11/2013 | Aggarwal et al. |
| 2014/0028440 A1 | 1/2014 | Takeuchi et al. |
| 2014/0052615 A1 | 2/2014 | Andersen |
| 2014/0068719 A1 | 3/2014 | Kiukkonen et al. |
| 2014/0123043 A1 | 5/2014 | Schmidt et al. |
| 2014/0149282 A1 | 5/2014 | Philliou et al. |
| 2014/0179340 A1 | 6/2014 | Do et al. |
| 2014/0187257 A1 | 7/2014 | Emadzadeh et al. |
| 2014/0370879 A1 | 12/2014 | Redding et al. |
| 2015/0031388 A1 | 1/2015 | Chatterjee et al. |
| 2015/0079942 A1 | 3/2015 | Kostka et al. |
| 2015/0126119 A1 | 5/2015 | Schulz et al. |
| 2015/0178698 A1 | 6/2015 | Schulz et al. |
| 2016/0019531 A1 | 1/2016 | Gormley |
| 2016/0210606 A1 | 7/2016 | Henderson et al. |
| 2016/0259616 A1 | 9/2016 | Hosein et al. |
| 2018/0227712 A1 | 8/2018 | Post et al. |

FOREIGN PATENT DOCUMENTS

| | | |
|---|---|---|
| EP | 2 506 642 A1 | 10/2012 |
| JP | 2004-078662 A | 3/2004 |
| JP | 2005-269172 A | 9/2005 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 2010/097711 A2 | 9/2010 |

(56) References Cited

FOREIGN PATENT DOCUMENTS

| WO | 2010/135174 A1 | 11/2010 |
|---|---|---|
| WO | 2013/009891 A1 | 1/2013 |
| WO | 2015/013170 A1 | 1/2015 |

OTHER PUBLICATIONS

Non-Final Office Action dated Aug. 7, 2009, for U.S. Appl. No. 12/050,752, of Niedermeyer, B.J., filed Mar. 18, 2008.
Notice of Allowance dated Dec. 16, 2009, for U.S. Appl. No. 12/050,752, of Niedermeyer, B.J., filed Mar. 18, 2008.
Non-Final Office Action dated Sep. 10, 2010, for U.S. Appl. No. 12/707,228, of Niedermeyer, B.J., filed Feb. 17, 2010.
Final Office Action dated Mar. 31, 2011, for U.S. Appl. No. 12/707,228, of Niedermeyer, B.J., filed Feb. 17, 2010.
Non-Final Office Action dated Oct. 10, 2012, for U.S. Appl. No. 13/179,832, of Dorsey, J., et al., filed Jul. 11, 2011.
Final Office Action dated Jun. 27, 2013, for U.S. Appl. No. 13/179,832, of Dorsey, J., et al., filed Jul. 11, 2011.
Advisory Action dated Oct. 24, 2013, for U.S. Appl. No. 13/179,832, of Dorsey, J., et al., filed Jul. 11, 2011.
Non-Final Office Action dated Jan. 8, 2014, for U.S. Appl. No. 13/179,832, of Dorsey, J., et al., filed Jul. 11, 2011.
Non Final Office Action dated Dec. 1, 2014, for U.S. Appl. No. 13/802,064, of Lee, B., filed Mar. 13, 2013.
Notice of Allowance dated Feb. 6, 2015, for U.S. Appl. No. 13/802,290, of Lee, B., filed Mar. 13, 2013.
Final Office Action dated Mar. 20, 2015, for U.S. Appl. No. 13/802,064, of Lee, B., filed Mar. 13, 2013.
Notice of Allowance dated Apr. 13, 2015, for U.S. Appl. No. 13/801,340, of Lee, B., filed Mar. 13, 2013.
Non Final Office Action dated Oct. 1, 2015, for U.S. Appl. No. 14/803,850, of Lee, B., filed Jul. 20, 2015.
Notice of Allowance dated Oct. 13, 2015, for U.S. Appl. No. 13/802,064, of Lee, B., filed Mar. 13, 2013.
Non-Final Office action dated Oct. 19, 2015, for U.S. Appl. No. 13/948,871, of Post, J.D., et al., filed Jul. 23, 2013.
Non Final Office Action dated Jan. 13, 2016, for U.S. Appl. No. 14/726,165, of Lee, B., filed May 29, 2015.
Non-Final Office Action dated Mar. 10, 2016, for U.S. Appl. No. 14/065,760, of Henderson, W., et al., filed Oct. 29, 2013.
Notice of Allowance dated May 12, 2016, for U.S. Appl. No. 14/726,165, of Lee, B., filed May 29, 2015.
Final Office action dated May 17, 2016, for U.S. Appl. No. 13/948,871, of Post, J.D., et al., filed Jul. 23, 2013.
Final Office Action dated Jul. 6, 2016, for U.S. Appl. No. 14/065,760, of Henderson, W., et al., filed Oct. 29, 2013.
Final Office Action dated Jul. 22, 2016, for U.S. Appl. No. 14/803,850, of Lee, B., filed Jul. 20, 2015.
Non-Final Office Action dated Jul. 29, 2016, for U.S. Appl. No. 14/079,320, of Chatterjee, S., et al., filed Nov. 13, 2013.
Examination Report No. 1 for Australian Patent Application No. 2014293388, dated Aug. 2, 2016.
Advisory Action dated Sep. 1, 2016, for U.S. Appl. No. 13/948,871, of Post, J.D., et al., filed Jul. 23, 2013.
Non-Final Office Action dated Sep. 28, 2016, for U.S. Appl. No. 14/042,366, of Brock, Z., et al., filed Sep. 30, 2013.
Non-Final Office action dated Dec. 16, 2016, for U.S. Appl. No. 13/948,871, of Post, J.D., et al., filed Jul. 23, 2013.
Examiner Requisition for Canadian Patent Application No. 2,919,238, dated Feb. 6, 2017.
Non Final Office Action dated Mar. 1, 2017, for U.S. Appl. No. 14/941,020, of Lee, B., filed Nov. 13, 2015.
Non-Final Office Action dated Apr. 4, 2017, for U.S. Appl. No. 15/269,865, of Lee, B., filed Sep. 19, 2016.
Non-Final Office Action dated Apr. 6, 2017, for U.S. Appl. No. 14/065,760, of Henderson, W., et al., filed Oct. 29, 2013.
Notice of Allowance dated Apr. 7, 2017, for U.S. Appl. No. 14/803,850, of Lee, B., filed Jul. 20, 2015.
Final Office Action dated Apr. 11, 2017, for U.S. Appl. No. 14/079,320, of Chatterjee, S., et al., filed Nov. 13, 2013.
Non-Final Office Action dated May 4, 2017, for U.S. Appl. No. 15/084,390, of Henderson, W., et al., filed Mar. 29, 2016.
Advisory Action dated Jul. 20, 2017, for U.S. Appl. No. 14/079,320, of Chatterjee, S., et al., filed Nov. 13, 2013.
Final Office action dated Jul. 20, 2017, for U.S. Appl. No. 13/948,871, of Post, J.D., et al., filed Jul. 23, 2013.
Notice of Allowance dated Jul. 25, 2017, for U.S. Appl. No. 15/269,865, of Lee, B., filed Sep. 19, 2016.
Final Office Action dated Sep. 27, 2017, for U.S. Appl. No. 14/941,020, of Lee, B., filed Nov. 13, 2015.
Advisory Action dated Oct. 5, 2017, for U.S. Appl. No. 13/948,871, of Post, J.D., et al., filed Jul. 23, 2013.
Non-Final Office Action dated Oct. 6, 2017, for U.S. Appl. No. 14/079,320, of Chatterjee, S., et al., filed Nov. 13, 2013.
Final Office Action dated Oct. 18, 2017, for U.S. Appl. No. 15/084,390, of Henderson, W., et al., filed Mar. 29, 2016.
Final Office Action dated Nov. 1, 2017, for U.S. Appl. No. 14/065,760, of Henderson, W., et al., filed Oct. 29, 2013.
Notice of Allowance dated Nov. 6, 2017, for U.S. Appl. No. 13/948,871, of Post, J.D., et al., filed Jul. 23, 2013.
Advisory Action dated Jan. 4, 2018, for U.S. Appl. No. 14/941,020, of Lee, B., filed Nov. 13, 2015.
Final Office Action dated Jan. 8, 2018, for U.S. Appl. No. 14/042,366, of Brock, Z., et al., filed Sep. 30, 2013.
Examiner Requisition for Canadian Patent Application No. 2,919,238, dated Feb. 9, 2018.
Final Office Action dated Feb. 22, 2018, for U.S. Appl. No. 14/079,320, of Chatterjee, S., et al., filed Nov. 13, 2013.
Examination Report No. 1 for Australian Patent Application No. 2017208387, dated Feb. 26, 2018.
Advisory Action dated Feb. 28, 2018, for U.S. Appl. No. 14/065,760, of Henderson, W., et al., filed Oct. 29, 2013.
Non-Final Office Action dated Mar. 22, 2018, for U.S. Appl. No. 14/941,020, of Lee, B., filed Nov. 13, 2015.
International Search Report and Written Opinion for International Application No. PCT/US2012/046282, dated Oct. 4, 2012.
Burke, R.R., "The Third Wave of Marketing Intelligence," Retailing in the 21st Century: Current and Future Trends, pp. 103-115 (2010).
Chediak, M., "Retail technology; Grocers get taste of future; Store owners who want to stand out in the crowd these days are embracing cutting-edge services," The Orlando Sentinel, pp. 1-2 (Jan. 21, 2006).
Shekar, S., et al., "iGrocer—A Ubiquitous and Pervasive Smart Grocery Shopping System," Proceedings of the 2003 ACM Symposium on Applied Computing, pp. 645-652 (Mar. 9, 2003).
Non-Final Office Action dated May 16, 2018, for U.S. Appl. No. 15/084,390, of Henderson, W., et al., filed Mar. 29, 2016.
Non-Final Office Action dated Jun. 25, 2018, for U.S. Appl. No. 14/042,366, of Brock, Z., et al., filed Sep. 30, 2013.
Non-Final Office Action dated Aug. 6, 2018, for U.S. Appl. No. 14/065,760, of Henderson, W., et al., filed Oct. 29, 2013.
Notice of Allowance dated Aug. 8, 2018, for U.S. Appl. No. 14/079,320, of Chatterjee, S., et al., filed Nov. 13, 2013.
Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 7, 2014, pp. 1-3.
Non-Final Office Action dated Jun. 23, 2015, for U.S. Appl. No. 13/763,504, of Brock, Z., filed Feb. 8, 2013.
Final Office Action dated Jan. 4, 2016, for U.S. Appl. No. 13/763,504, of Brock, Z., filed Feb. 8, 2013.
Non-Final Office Action dated Sep. 12, 2016, for U.S. Appl. No. 13/763,504, of Brock, Z., filed Feb. 8, 2013.
Notice of Allowance dated Jan. 6, 2017, for U.S. Appl. No. 13/763,504, of Brock, Z., filed Feb. 8, 2013.
Advisory Action dated May 15, 2018, for U.S. Appl. No. 14/042,366, of Brock, Z., et al., filed Sep. 30, 2013.
International Search Report and Written Opinion for International Application No. PCT/US2014/047381 dated Nov. 25, 2014.
Advisory Action dated Mar. 29, 2019, for U.S. Appl. No. 15/084,390, of Henderson, W., et al., filed Mar. 29, 2016.

(56) References Cited

OTHER PUBLICATIONS

"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!" Articlesbase (articlesbase.com), Sep. 7, 2009, Retrieved from the Internet URL: http://www.articlesbase.com/electronics-articles/a-magnetic-stripe-reader-read-credit-cards-. . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
"Arduino magnetic stripe decoder," Instructables, Retrieved from the Internet URL: http://www.instructables.com/id/Arduino-magneticstripe-decorded, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Headphone Jack (3.5mm)," Retrieved from the Internet URL: http://www.phonescoop.com/glossary/term.php?gid=440, on May 5, 2011, pp. 1-1.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS- Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44/2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," dated Nov. 10, 2014, Retrieved from the internet URL: https://play.google.com/store/apps/details?id=com.ubercab&hl=en, on Nov. 12, 2014, pp. 2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open . . . , on Feb. 7, 2011, pp. 1-4.
Bauer, Gr. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free" ("Lekemel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Finzgar et. al.; "Use of NFC and QR code identification in an electronic ticket system for public transport"; Published in SoftCOM 2011, 19th International Conference on Software, Telecommunications and Computer networks; Published Nov. 1, 2011 (Year: 2011).
Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 1, 2014, pp. 1-3.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.netnag/business-tools/vterminal-credit-card-processing-app-for-authorizenet-and-paypal-payflow-pro-for-curve-8350-8500-890-download-2075.html, on Mar. 30, 2015, pp. 1-4.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Padilla, L. "The simplest magnetic stripe reader," Jan. 27, 2003, Retrieved from the Internet URL: www.gae.ucm.esi-padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Siegler, MG., "MobilePay May Be the Death of the Wallet. Yes, for Real This Time," TechCrunch, dated Sep. 28, 2010, Retrieved from the Internet URL: http://techcrunch.com/2010/09/28/mobilepayusai, on Sep. 22, 2013, pp. 12.
Titlow, J.P., "ROAM pay is like Square for Blackberry (Plus Android, iOS and Desktops)," Dec. 1, 2010, Retrieved from the

(56) References Cited

OTHER PUBLICATIONS

Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Final Office Action dated Oct. 30, 2018, for U.S. Appl. No. 14/941,020, of Lee, B., filed Nov. 13, 2015.
Examination Report No. 2 for Australian Patent Application No. 2017208387, dated Nov. 9, 2018.
Non-Final Office Action dated Dec. 13, 2018, for U.S. Appl. No. 15/909,005, of Post, J.D., et al., filed Mar. 1, 2018.
Final Office Action dated Dec. 13, 2018, for U.S. Appl. No. 15/084,390, of Henderson, W., et al., filed Mar. 29, 2016.
Examiner Requisition for Canadian Patent Application No. 2,919,238, dated Dec. 20, 2018.
Notice of Allowance dated Feb. 4, 2019, for U.S. Appl. No. 14/042,366, of Brock, Z., filed Sep. 30, 2013.
Advisory Action dated Feb. 8, 2019, for U.S. Appl. No. 14/941,020, of Lee, B., filed Nov. 13, 2015.
Examination Report No. 3 for Australian Patent Application No. 2017208387, dated Feb. 11, 2019.
Notice of Allowance dated Mar. 15, 2019, for U.S. Appl. No. 14/941,020 of Lee, B., filed Nov. 13, 2015.
Final Office Action dated Apr. 4, 2019, for U.S. Appl. No. 14/065,760, of Henderson, W., et al., filed Oct. 29, 2013.
Final Office Action dated Apr. 4, 2019, for U.S. Appl. No. 15/909,005, of Post, D. J., et al., filed Jan. 3, 2018.
Advisory Action dated Jun. 17, 2019, for U.S. Appl. No. 15/909,005, of Post, D. J., et al., filed Jan. 3, 2018.
Advisory Action dated Jul. 8, 2019, for U.S. Appl. No. 14/065,760, of Henderson, W., et al., filed Oct. 29, 2013.
Notice of Allowance dated Sep. 25, 2019, for U.S. Appl. No. 15/909,005, of Post, D. J., et al., filed Jan. 3, 2018.
Non-Final Office Action dated Oct. 30, 2019, for U.S. Appl. No. 15/084,390, of Henderson, W., et al., filed Mar. 29, 2016.
Examiner Requisition for Canadian Patent Application No. 2,919,238, dated Nov. 5, 2019.
Examination report for Australian Patent Application No. 2019201310, dated Nov. 25, 2019.
Notice of Allowance dated May 14, 2020, for U.S. Appl. No. 15/084,390, of Henderson, W., et al., filed Mar. 29, 2016.
Notice of Acceptance for Australian Patent Application No. 2019201310, dated Jul. 21, 2020.

* cited by examiner ized and captured. In the
UPDATING MERCHANT LOCATION FOR CARDLESS PAYMENT TRANSACTIONS

RELATED APPLICATIONS

This application claims priority to and is a continuation of U.S. patent application Ser. No. 13/763,504, filed on Feb. 8, 2013, the entire contents of which are incorporated herein by reference.

TECHNICAL FIELD

This disclosure relates to cardless payment transactions.

BACKGROUND

When searching for merchants, a user can enter a search query into a search engine. The search query can include a merchant's name or a name of a desired product or service. The user can limit the search by location. The search engine can return results to the user in response to the search query, including any limitations provided by the user. To perform a transaction (e.g., a purchase) with a merchant listed in the search results, the user must visit the merchant's retail store or the merchant's online shopping portal.

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

This specification relates to updating data describing merchants in a listing of merchants that allow cardless payment transactions. A convenient graphical user interface that lists merchants that accept cardless payment transactions can be displayed on a user's user device, e.g., a mobile device. Merchants included in the listing can be ranked based on a geographic distance from the user to the respective merchant. The user can choose to conduct a transaction with a merchant after selecting the merchant using the graphical user interface. As used in this specification, a cardless payment transaction is one where a user conducts the transaction with a merchant at a point of sale using a financial account without physically presenting a payment card to the merchant at the point of sale. In fact, the merchant need not receive any details about the financial account, e.g., the credit card issuer, credit card number, and the like is not provided to the merchant.

Electronic payment transactions between a user and a merchant are generally restricted to situations in which the user is within a predetermined distance of the merchant. The geographic distance between the user and a merchant is generally based on the user's geographic position, for example, as determined by a geolocation data from the user device, and a geographic location of the merchant, as determined by, for example, a known street address for the merchant or by geolocation data from the user device.

In some cases, a merchant's geographic location, as determined by the merchant's known street address, is inconsistent with the merchant's actual geographic location. For example, the merchant may have relocated to a different geographic location or the merchant's known street address was incorrect. In such cases, the listing of merchants may indicate that a merchant is not within a predetermined distance of a user despite the user being located within a predetermined distance of the merchant. In some cases, the merchant's place of business is a mobile shop (e.g., a food truck) that regularly changes geographic locations. In such cases, a user may travel to the merchant's geographic location that was provided in a listing of merchants only to discover that the merchant has relocated to a different geographic location. In either case, the user may be prohibited from conducting an electronic payment transaction with the merchant, since the two are not within a predetermined distance of each other.

To address this issue, the user device sends a request to a payment service system requesting that the merchant's geographic location, as provided in the listing of merchants, be updated to the merchant's correct geographic location. The payment service system sends a request for an updated geographic location to a computing device of the merchant. In response to receiving the request, the merchant updates its geographic location, for example, by providing an updated street address, and sends geolocation data describing the updated geographic location to the payment service system. Alternatively, in response to receiving the request, the merchant's computing device can send geolocation data describing the updated geographic location to the payment service system. The payment service system can update the data describing the merchant in the listing of merchants to include the updated geographic location.

In one aspect, a method includes receiving, from a user device, a request for a listing of merchants; in response to receiving the request for a listing of merchants, sending, to the user device, data describing one or more merchants and respective initial geographic locations of the one or more merchants; receiving, from the user device, a user request for updating a geographic location of a particular merchant in the one or more merchants; sending a request for an updated geographic location to a computing device of the particular merchant; receiving, from the computing device of the particular merchant, data describing an updated geographic location of the particular merchant; and providing, to the user device, data describing the updated geographic location of the particular merchant.

Implementations may include one or more of the following features. Data describing the one or more merchants includes, for each merchant, a respective merchant name and one or more of: a respective initial geographic location of the merchant, one or more coupons provided by the merchant, an icon representing the merchant, or an icon indicating whether the merchant is authorized to perform a transaction with the user. The method further includes updating the data describing the one or more merchants with the updated geographic location of the particular merchant. The method further includes receiving, from the user device, a current geographic location of the user device; and wherein the one or more merchants are located within a threshold distance from the current geographic location of the user device.

In one aspect, a method includes receiving, from a user device, a user request for data describing a particular merchant that is within a threshold distance from a current geographic location of the user device, wherein the data describes the particular merchant as not being within the threshold distance from the current geographic location of the user device; in response to receiving the request for data describing the particular merchant, providing, to the user device, data describing the particular merchant; receiving, from the user device, a user request for updating an initial geographic location of the particular merchant; sending a request for an updated geographic location to a computing device of the particular merchant; receiving, from the computing device of the particular merchant, data describing an updated geographic location of the particular merchant; and providing, to the user device, data describing the updated geographic location of the particular merchant.

Implementations may include one or more of the following features. Data describing the particular merchant includes a respective merchant name and one or more of: a respective initial geographic location of the merchant, one or more coupons provided by the merchant, an icon representing the merchant, or an icon indicating whether the merchant is authorized to perform a transaction with the user. The method further includes updating the data describing the one or more merchants with the updated geographic location of the particular merchant.

Advantages may include one or more of the following. A customer can send a request to update a merchant's geographic location provided in a listing of merchants. Geographic locations of merchants in a listing of merchants can be validated by users. Correction of geographic locations of merchants can be initiated by users.

BRIEF DESCRIPTION OF THE DRAWINGS

Like reference numbers and designations in the various drawings indicate like elements.

DETAILED DESCRIPTION

Figure 1:
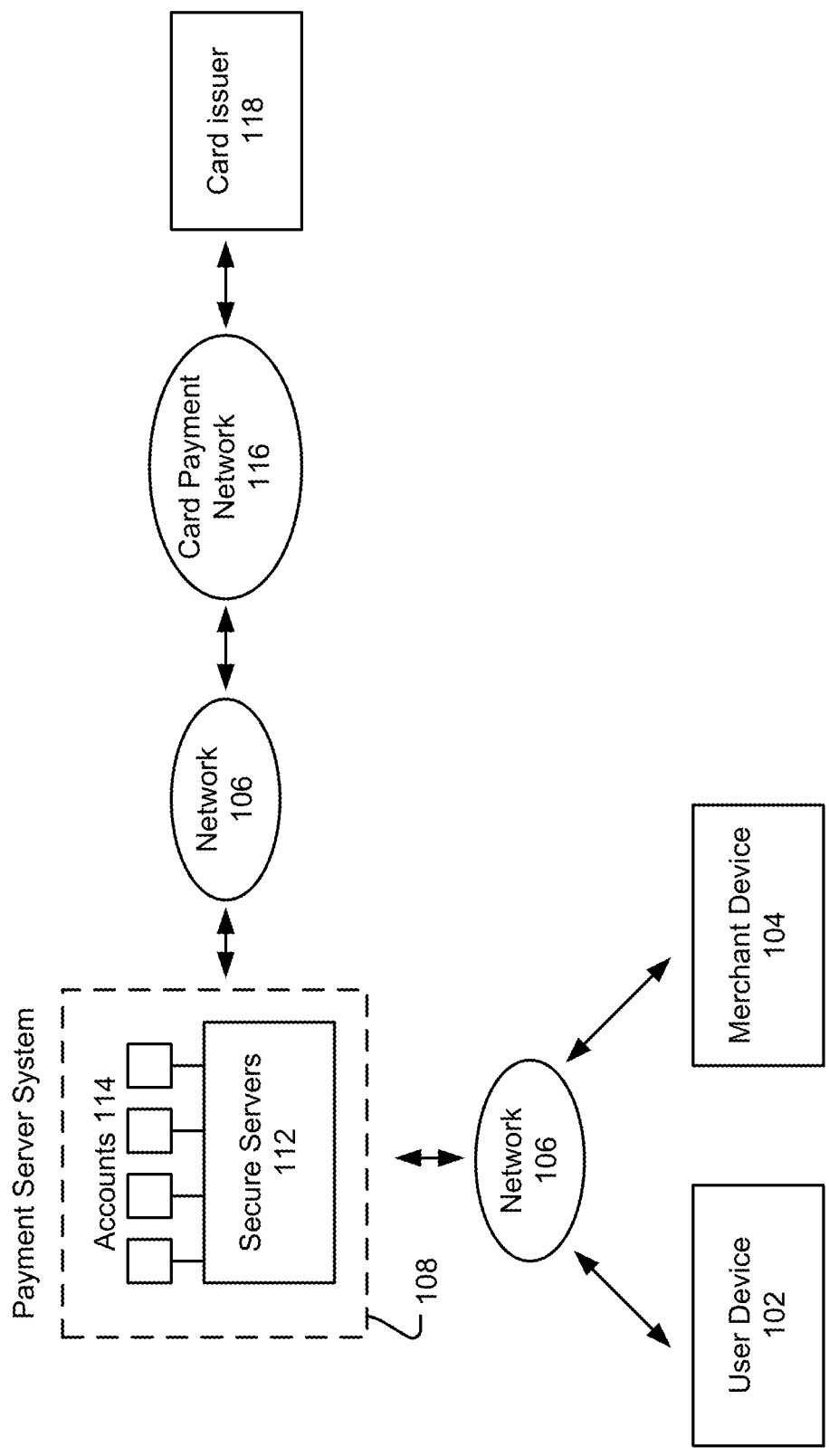
FIG. 1 is a schematic illustration of an example cardless payment system architecture.

FIG. 1 is a schematic illustration of the architecture of an example cardless payment system 100. The overall system 100 includes a user device 102 and merchant device 104 connected to a network 106, e.g., the Internet. The user device 102 is a mobile computing device, e.g., a hand-held computing device, capable of running a user application. For example, the user device 102 can be a mobile device, e.g., a smartphone or tablet computer. The merchant device 104 is also a computing device capable of running a merchant application. The merchant device 104 can be a mobile device, a desktop computer, a laptop computer, a dedicated point of sale system, or other data processing apparatus.

A cardless payment processor operates a payment service system 108. The user device 102 and the merchant device 104 can communicate with the payment service system 108 through the network 106. The payment service system 108 includes one or more servers 112, at least some of which are configured to service secured transactions (e.g., a secure server), and to process electronic payment transactions between the user device 102 and the merchant device 104. In general, servers 112 can store public merchant information, e.g., the merchant's name, street address, and telephone numbers. The servers 112 can also be configured to transfer and update the user application to the user device 102, and to transfer and update the merchant application to the merchant device 104. The servers 112 can store data describing merchants that have merchant accounts 114 with the payment server system 108. The data describing the merchants can include a merchant name, street address, telephone numbers, and theme, e.g., color motif and logos. The servers 112 can be also be configured to send and receive data describing merchants that have merchant accounts 114 with the payment server system 108 to and from the user device 102 and the merchant device 104. The servers 112 can also be configured to send and receive secure information, e.g., credit card numbers, debit card numbers, bank accounts, user accounts, user identifying information, or other sensitive information to and from the user device 102 and the merchant device 104.

The payment service system 108 can communicate with a computer system 116 of a card payment network, e.g., Visa or MasterCard. The payment service system 108 can communicate with a computer system 116 over the network 106, or over a different network. The computer system 116 of the card payment network can communicate with a computer system 118 of a card issuer, e.g., a bank. There can also be computer systems of other entities, e.g., the card acquirer, between the payment service system 108 and the card issuer.

Generally, transactions between the user and the merchant are permitted using the payment server system 108 when the user has a user account with the payment service system 108. Similarly, the merchant also has a merchant account with the payment service system 108. When the user and the merchant enter into a transaction, the transaction can be processed through the exchange of funds between the user account and the merchant account.

Figure 2:
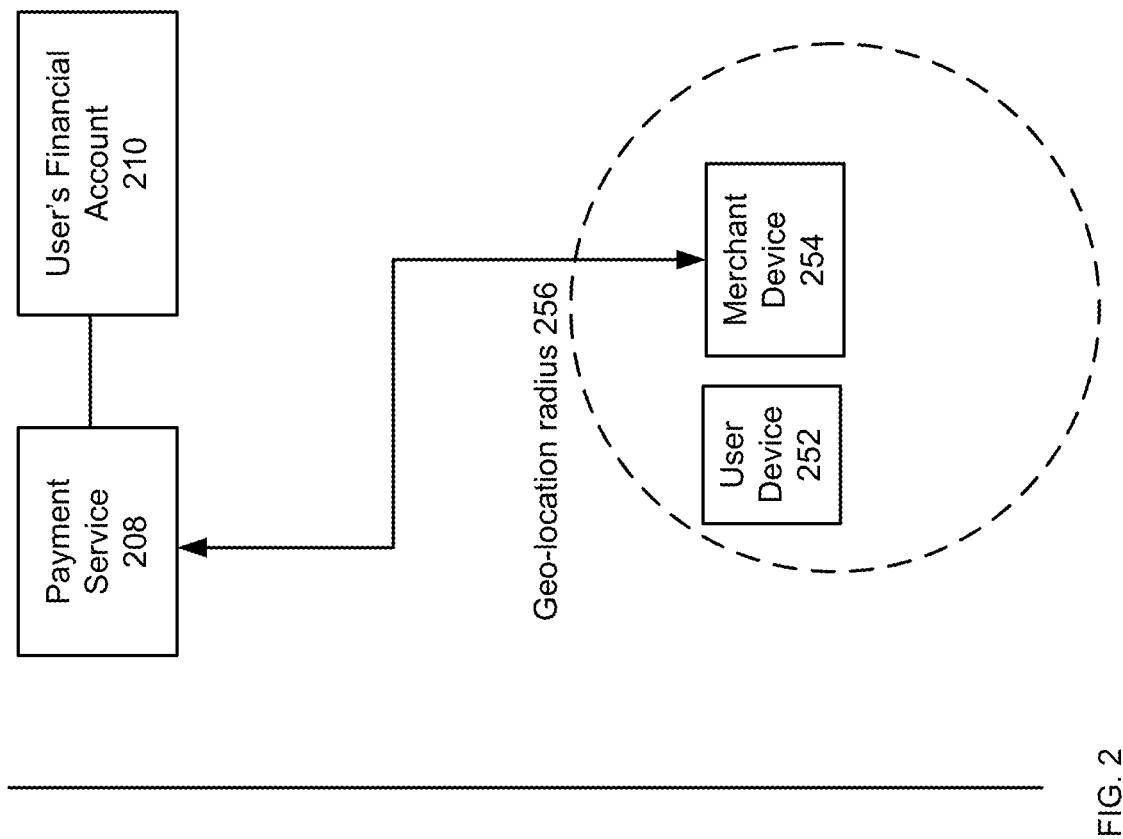
FIG. 2 is a diagram of an example implementation of the cardless payment system.
Figure 2:
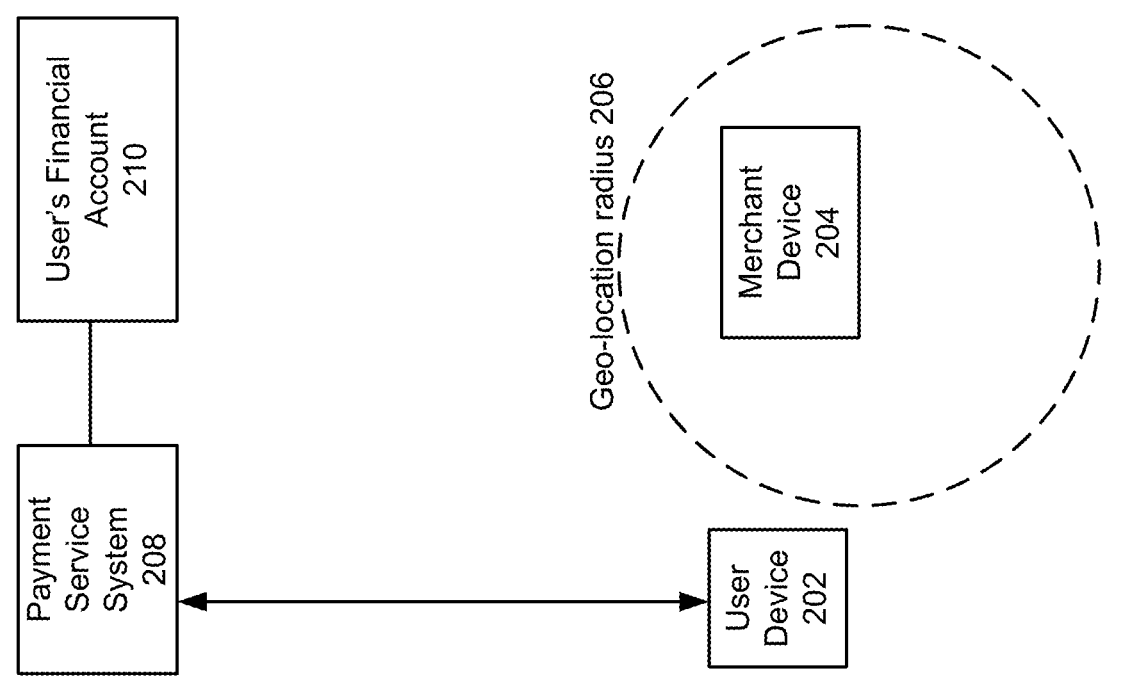

FIG. 2 is a diagram that outlines an example implementation of the cardless payment system 100. In FIG. 2, a user is interacting with a user device 202 to access a user application while a merchant is interacting with a merchant device 204 to access a merchant application. Users and merchants each have an association, e.g., an account, with the payment service system 208, e.g., the payment service system 108, as described in reference to FIG. 1. For example, the user can interact with the user application to obtain a listing of merchants that accept cardless transactions. The user can further interact with the user application to select and enter into a cardless transaction with a particular merchant.

In some implementations, when conducting cardless transactions, the payment service system 208 defines a geo-location radius, e.g., the geo-location radius 206 and the geo-location radius 256, around the geographic location of a merchant. In such implementations, transactions between a user device and a merchant device are permitted when both the user device and the merchant device are geographically located within the defined geo-location radius. Depending on the implementation, the merchant's geographic location can be determined by geo-locating the merchant device, e.g., the merchant device 204, or based on the merchant's street address. In some implementations, the geo-location radius is defined as a 500 foot radius around the merchant's geographic location. In some implementations, the geo-location radius is set by the merchant. In such implementations, the payment service system 208 receives input from the merchant device, e.g., the merchant device 204, or another computer system of the merchant, specifying the geo-location radius.

In the example of FIG. 2, the merchant application in the merchant device 204 does not provide an option to conduct a cardless payment transaction with the user device 202, since the user device 202 is not located within the geo-location radius 206. In such cases, the user device 202 will indicate to the user that the user is not within the geo-location radius 206 of the merchant. As a result of the user device 202 not being located within the geo-location radius 206, the merchant device 204 will not be able to enter into a transaction with the user.

In contrast, the example of FIG. 2 also illustrates a user is interacting with a user device 252 to access a user application while a merchant is interacting with a merchant device 254 to access a merchant application. The user and the merchant each have an association, e.g., an account, with the payment service system 208, e.g., the payment service system 108, as described in reference to FIG. 1. As described above, the payment service system 208 defines a geo-location radius, e.g., the geo-location radius 256 around the geographic location of a merchant device 254. Since the user device 252 is located within the geo-location radius 256 of the merchant device 254, the user and merchant are able to conduct a cardless transaction.

Figure 3A:
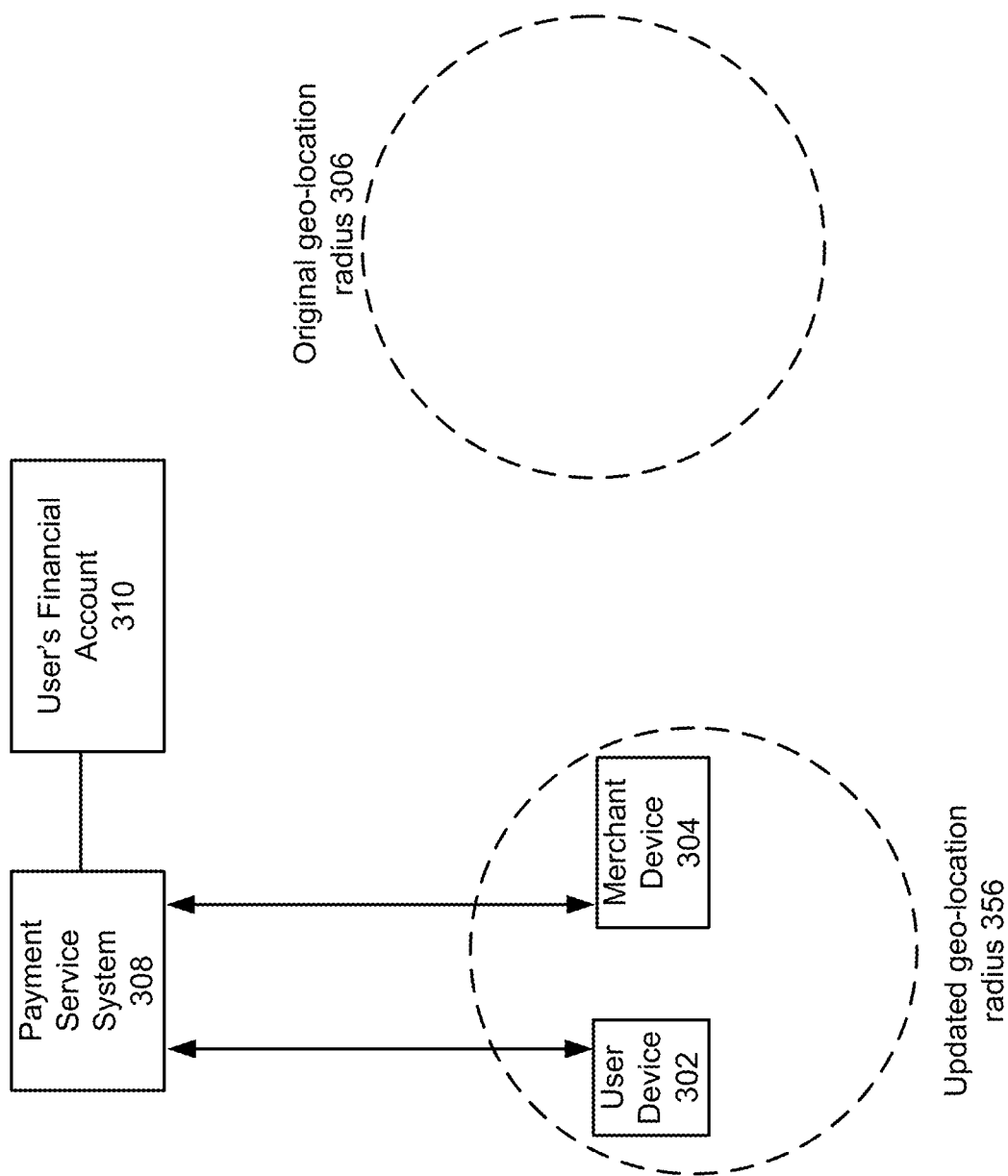
FIGS. 3A-3B are diagrams illustrating a process for updating merchant data.

FIG. 3A is a diagram illustrating a process for updating merchant data. In FIG. 3A, a user is interacting with a user device 302 to access a user application while a merchant is interacting with a merchant device 304 to access a merchant application. As described above, users and merchants each have an association, e.g., an account, with the payment service system 308, e.g., the payment service system 108, as described in reference to FIG. 1.

In the example of FIG. 3A, the user operating the user device 302 is geographically located at the merchant's geographic location, e.g., at the merchant's store. In FIG. 3A, the payment service system 308 will prohibit transactions between the user device 302 and the merchant device 304 because the user device 302 is not geographically located within a geo-location radius 306. In particular, the geo-location radius 306 is defined by the payment system 308 using the merchant's last known street address. However, in the example of FIG. 3A, the merchant is not geographically located at the region defined by the geo-location radius 306. The merchant may have, for example, relocated to a new address without updating its street address with the payment service system 308. Thus, the user device will indicate that the user is not within the geo-location radius 306 of the merchant, which is determined based on the merchant's incorrect street address, when, in fact, the user is actually located at the merchant's geographic location. As a consequence, the merchant and the user are prohibited from conducting a transaction.

The user operating the user device 302 may request that the merchant update its geographic location, e.g., street address, with the payment service system 208. When making the request, the user interacts with the user device 302 to send the request to the payment service system 308 requesting that the merchant's geographic location, as provided in the listing of merchants, be updated. In such implementations, the payment service system 308 sends a request for an updated geographic location to the merchant device 304 of the merchant. In response to receiving the request, the merchant interacts with the merchant device 304 to update its geographic location, for example, by providing an updated street address and sending the updated geographic location to the payment service system 308. For example, in responding to the request, the merchant device 304 can initiate a geolocation query to determine the merchant's geographic location and then send the geolocation data describing the merchant's geographic location to the payment service system 308. The system 308 updates the data describing the merchant in the listing of merchants to include the merchant's updated geographic location. The payment service system 308 can also send data describing the merchant's updated geographic location to the user device 302. Once the merchant's geographic location has been updated, the payment service system 308 can define a new geo-location radius 356 for the merchant's updated geographic location. The payment service system 308 can then determine whether the user device 302 is within the new geo-location radius 356 of the merchant device 304. In FIG. 3A, electronic payment transactions between the user and the merchant can be completed since both the user device 302 and the merchant device 304 are within the new geo-location radius 356.

Figure 3B:
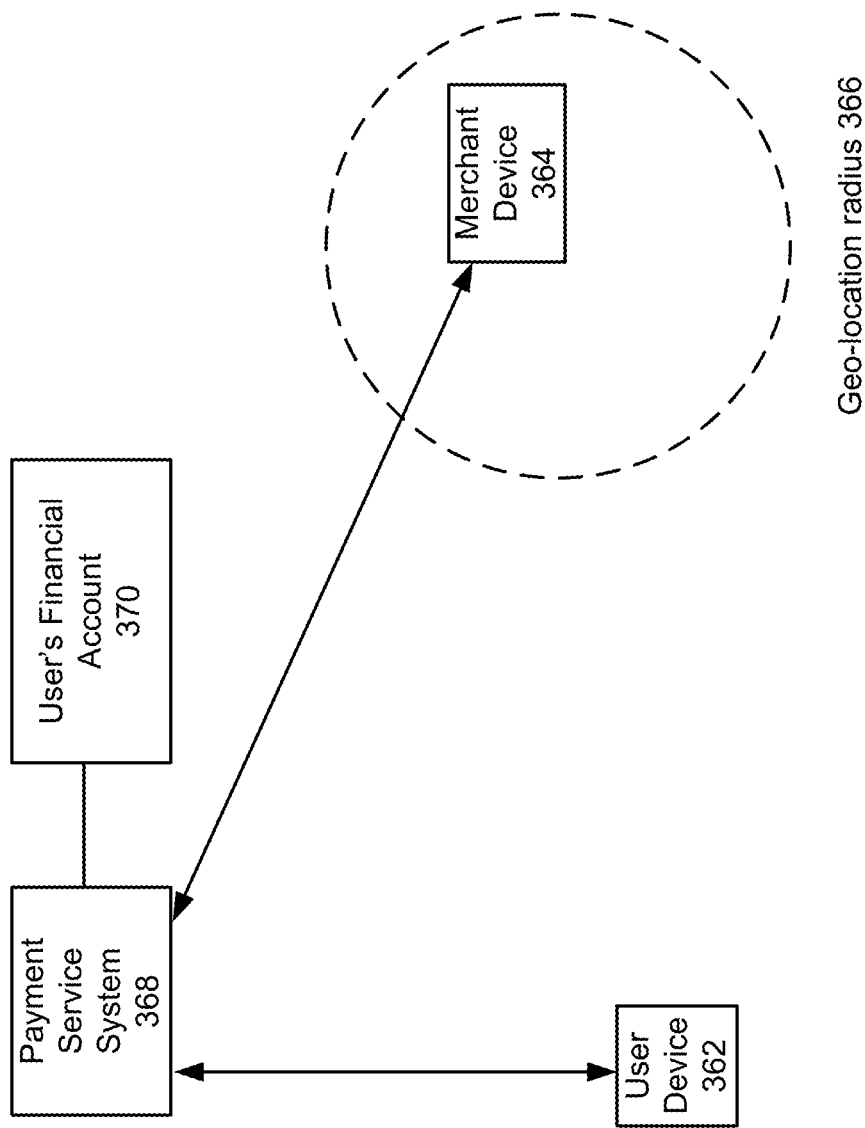

FIG. 3B is a diagram illustrating a process for updating merchant data. In FIG. 3B, a user is interacting with a user device 362 to access a user application while a merchant is interacting with a merchant device 364 to access a merchant application. As described above, users and merchants each have an association, e.g., an account, with the payment service system 368, e.g., the payment service system 108, as described in reference to FIG. 1.

In the example of FIG. 3B, the merchant's place of business is a mobile shop (e.g., a food truck) that regularly changes geographic locations. In FIG. 3B, the user operating the user device 362 is geographically located at a previous geographic location of the merchant that was determined from a listing of merchants accessed using the user device 362. In such situations, the user operating the user device 362 may request that the merchant update its geographic location, e.g., street address, with the payment service system 368 to allow the user to determine the merchant's current geographic location. The user operating the user device can initiate a geographic location update using the process described in reference to FIG. 3A.

Figure 4:
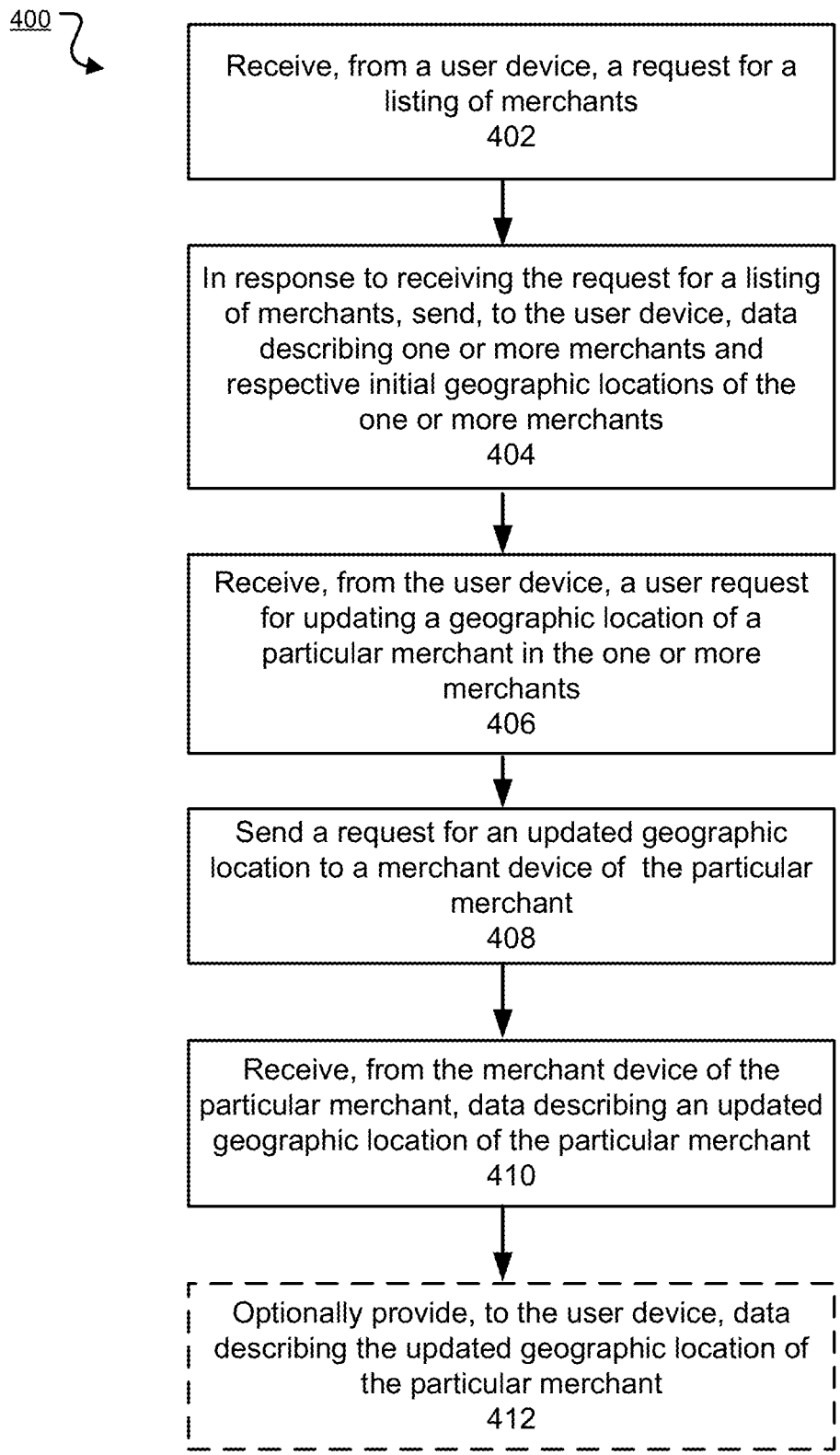
FIG. 4 is a diagram of an example flow chart for updating merchant data.

FIG. 4 is a diagram of an example flow chart of a process 400 for updating merchant data. For convenience, the process 400 will be described as performed by a system including one or more computing devices, e.g., the server system 108, as described in reference to FIG. 1. The system can be configured to send and receive communications between a user device, e.g., the user device 102, and a merchant device, e.g., the merchant device 104. The communications can be encrypted using secure protocols built into the user device, server system, and merchant device. In some implementations, this process is implemented through the applications installed on both the user's user device and the merchant's device.

The system receives, from the user device, a request for a listing of merchants (step 402). Typically, the user launches the user application on the user device. When launching the user application, the user device can communicate a request to the system to identify merchants that can perform cardless payment transactions. The request can include data describing a location of the user device, for example, as determined by the user device.

In response to receiving the request for a listing of merchants, the system sends, to the user device, data describing a listing of one or more merchants (step 404). The listing of one or more merchants includes merchants that have been identified by the system based on the location information of the user device, as described above in reference to FIG. 2. For example, the system can identify one or more merchants based on the user device being located within a respective threshold distance, e.g., a geo-location radius, of a merchant.

In some implementations, the data describing the one or more merchants includes, for each merchant, a respective merchant name and one or more of: a respective initial geographic location of the merchant, one or more coupons provided by the merchant, an icon representing the merchant, or an icon indicating whether the merchant is authorized to perform a transaction with the user.

The system receives, from the user device, a user request for updating a geographic location of a particular merchant in the one or more merchants (step 406). A user can interact with the user device to identify a particular merchant and to request an update of a geographic location of that merchant, as described above in reference to FIG. 3A. In some implementations, a user initiates the request by selecting an option on a graphical user interface, as described below. Once a request is initiated, the user device can communicate the request to the system.

The system sends a request for an updated geographic location to a computing device of the particular merchant (step 408). The system can send the request to a merchant device, as described above in reference to FIG. 3A.

The system receives, from the computing device of the particular merchant, data describing an updated geographic location of the particular merchant (step 410). For example, the merchant can provide the system with an updated geographic location, e.g., street address, as described above in reference to FIG. 3A. The process of providing the system with an updated geographic location can be automated. For example, the computing device of the particular merchant can determine the merchant's geographic location, and can send geolocation data describing the merchant's geographic location to the user device. In some implementations, automation of the process for providing updated geographic locations is enabled when a merchant opts-in. In some implementations, the system updates the data describing the merchant with the updated geographic location. Thus, the system can use the updated geographic location when defining a geo-location radius for the merchant in the future.

The system optionally provides, to the user device, data describing the updated geographic location of the particular merchant (step 412). The system can optionally provide the user device with the updated geographic location to be presented in the listing of merchants.

Figure 5:
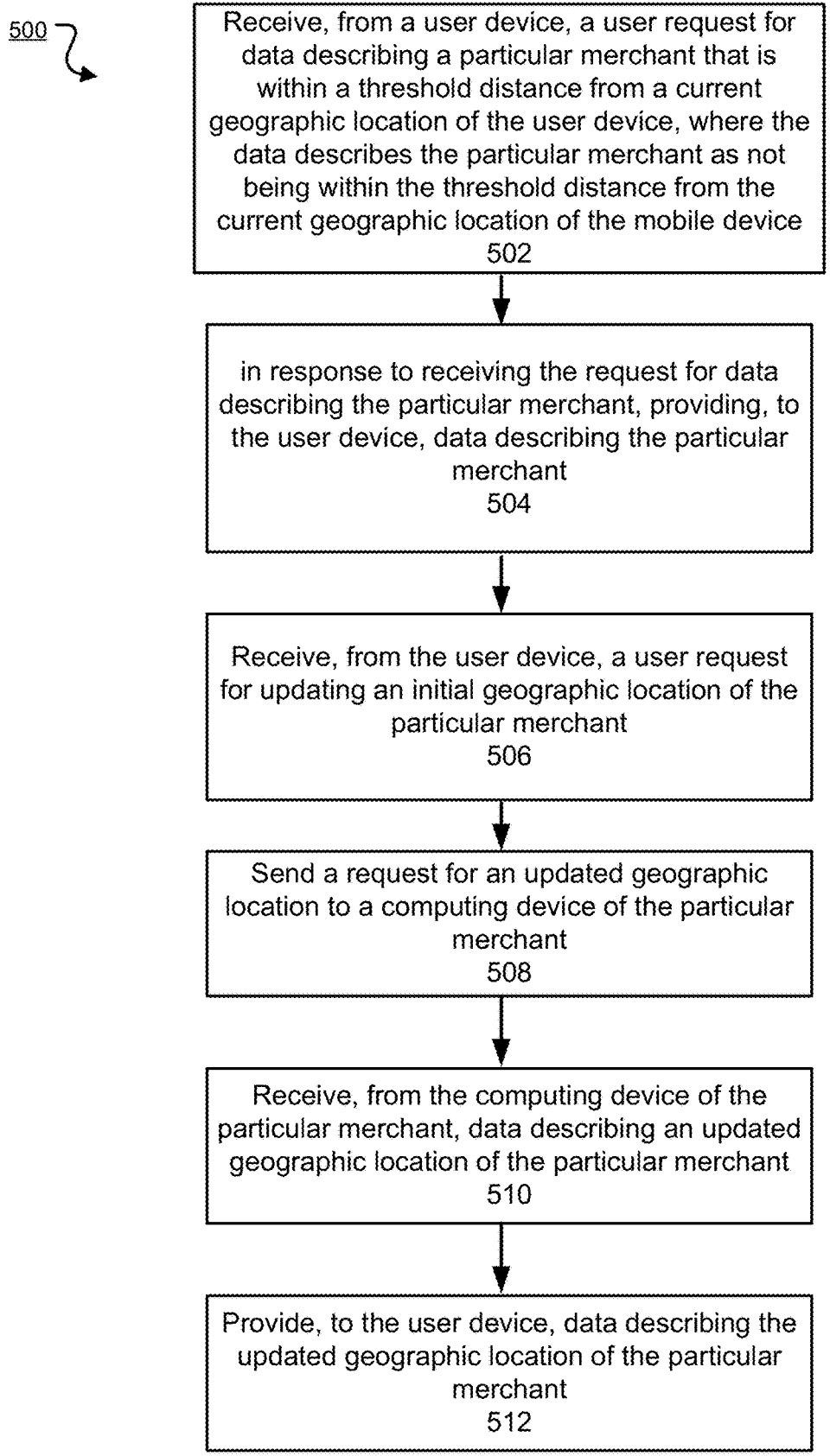
FIG. 5 is a diagram of another example flow chart for updating merchant data.

FIG. 5 is a diagram of an example flow chart of a process 500 for updating merchant data. For convenience, the process 500 will be described as performed by a system including one or more computing devices, e.g., the server system 108, as described in reference to FIG. 1. The system can be configured to send and receive communications between a user device, e.g., the user device 102, and a merchant device, e.g., the merchant device 104. The communications can be encrypted using secure protocols built into the user device, server system, and merchant device. In some implementations, this process is implemented through the applications installed on both the user's user device and the merchant's device.

The system receives, from a user device, a user request for data describing a particular merchant that is within a threshold distance from a current geographic location of the user device, where the data describes the particular merchant as not being within the threshold distance from the current geographic location of the user device (step 502). For example, the user operating the user device may be located at a store of the particular merchant. However, the data describing the particular merchant may indicate that the user is not within a threshold distance of the particular merchant. In particular, the user device may not be within a geo-location radius that was determined for the particular merchant using an incorrect street address.

In instances where the user device is not geographically located within a threshold distance of the particular merchant, the user device can display a message indicating its inability to "check in," or conduct a transaction with the particular merchant (e.g., by displaying a "too far to pay" message). In other words, the merchant cannot charge the user's financial account for a cardless payment transaction until the user is within a threshold distance and the merchant has the user's consent, as described further in reference to FIG. 5. However, if the user device is within the threshold distance, the user device can send an indication, to the system, of being within the threshold distance.

In response to receiving the request for data describing the particular merchant, the system provides, to the user device, data describing the particular merchant (step 504). In some implementations, the data describing the particular merchant includes a respective merchant name and one or more of: a respective initial geographic location of the merchant, one or more coupons provided by the merchant, an icon representing the merchant, or an icon indicating whether the merchant is authorized to perform a transaction with the user.

The system receives, from the user device, a user request for updating an initial geographic location of the particular merchant (step 506). A user can interact with the user device to identify a particular merchant and to request an update of an initial geographic location of that merchant, as described above.

The system sends a request for an updated geographic location to a computing device of the particular merchant (step 508). The system can send the request to a merchant device, as described above in reference to FIG. 3A.

The system receives, from the computing device of the particular merchant, data describing an updated geographic location of the particular merchant (step 510). For example, the merchant can provide the system with an updated geographic location, e.g., street address, as described above. In some implementations, the system updates the data describing the one or more merchants with the updated geographic location of the particular merchant.

The system provides, to the mobile device, data describing the updated geographic location of the particular merchant (step 512).

Figure 6:
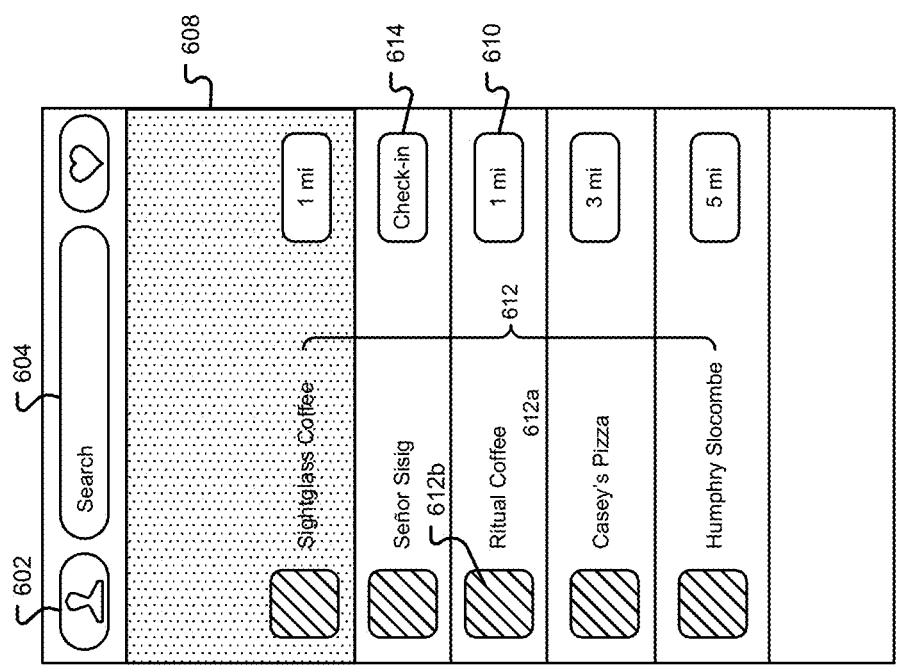
FIG. 6 is a diagram of an example view of an application's main page on the user's user device.

FIG. 6 is a diagram of example view of the user application's main page on a user's user device. The user application can retrieve a list of merchants 612 in response to an application query (e.g., on startup of the application). The application can display the list of merchants 612. The list of merchants can be organized into a plurality of rows, each row containing the name 612a of a single merchant. The list can also include an icon 612b for each merchant, e.g., located in the row with the name of the merchant. For example, each merchant's icon 612b can be located on the left side of the name 612a of the merchant. In some implementations, a cover image 608 for a merchant, e.g., the first merchant in the list, is displayed. The application can display a distance 610 that a merchant is from a current location of the user device.

Each merchant can be represented with a custom-designed "card." In some implementations, tapping the row containing the name 612a of the merchant, or tapping the name 612a of the merchant, will cause the user's user device to display more information regarding the respective merchant. In some implementations, the additional merchant information is represented by a custom-designed merchant page. For example, the user device can display a map around the merchant's area, the merchant's phone number, the merchant's operating hours, or other merchant information, as described in reference to FIGS. 7A and 7B.

The application can present user account information by tapping an account button 602. When provided with input, the application can search for merchants in a search bar 604. For example, the application can send the search query to a cardless payment system and be provided with merchants that are relevant to the search query.

If the current location of the user device is within a threshold distance of a merchant, the application can display a representative symbol (e.g., "Check-in" button 614). By tapping the check in button, the application can, among other things, conduct transactions with the merchant. If the user device's current location is not within the predetermined distance, the application can display a distance 610 from the user device to the merchant.

Figures 7A, 7B:
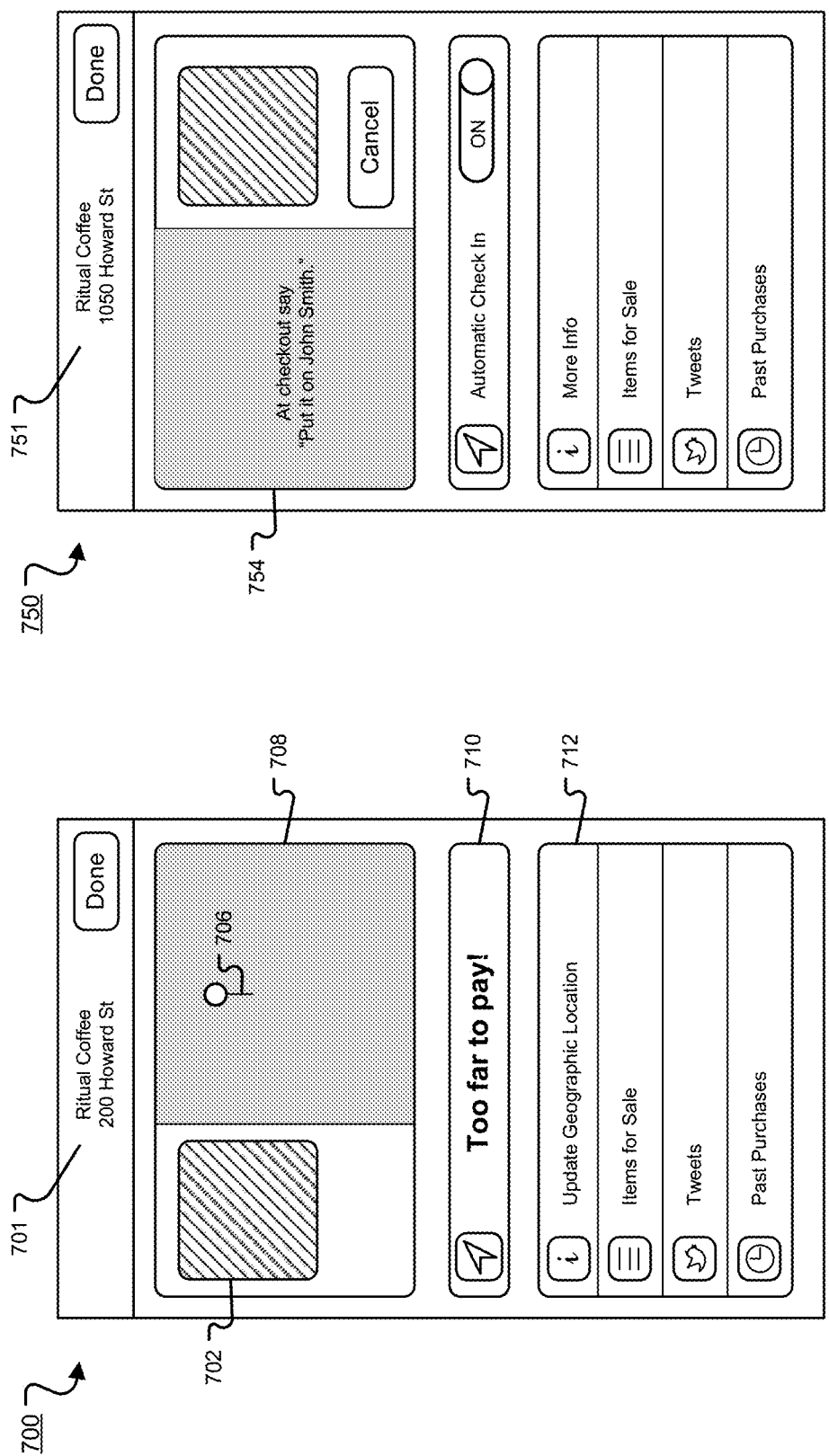
FIGS. 7A-B are diagrams of example application views illustrating the updating of merchant data.

FIG. 7A is a diagram of an example application view 700 when a user that is not within a threshold distance of a merchant. In FIG. 7A, the merchant is a coffee shop "Ritual Coffee." The application 700 shows the name of the merchant, the merchant's street address 701 (e.g., "200 Howard St."), and the merchant's logo 702.

In the example of FIG. 7A, the user is geographically located at a store of the merchant and is attempting to conduct a transaction with the merchant. However, in FIG. 7A, the data describing the merchant's geographic location (e.g., "200 Howard St.") is incorrect because the merchant has relocated to a different address (e.g., "1050 Howard St."). Thus, since the data describing the merchant's geographic location is incorrect, the user is provided with a message 710 (e.g., "Too far to pay!") indicating that the user is not within a threshold distance of the merchant when attempting to conduct the transaction. In such instances, the user can select an option 712 to request that the data describing the merchant's geographic location be updated, as described above. The user can then re-attempt to enter into the transaction once the merchant's geographic location is updated, as described in reference to FIG. 7B.

FIG. 7B is a diagram of an example application view 750 after a merchant has updated its geographic location. In FIG. 7B, the merchant's geographic location has been updated in response to a user request from an incorrect street address (e.g., "200 Howard St."), as described in reference to FIG. 7A, to a correct street address 751 (e.g., "1050 Howard St."). In the example of FIG. 7B, the user is geographically located at a store of the merchant and is re-attempting to conduct a transaction with the merchant. Since the user is geographically located within a threshold distance of the updated merchant address (e.g., "1050 Howard St."), the user and the merchant are permitted to conduct the transaction and the application view 750 provides the user instructions 754 for completing the transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
memory configured to store computer-readable instructions; and one or more processors configured to execute the computer-readable instructions to:
store information associated with a financial account of a user;
receive, via a user application running on a user device and communicatively coupled to the one or more processors, a first request for a first geographic location associated with a merchant;
send the first geographic location to the user application on the user device;
determine that the first geographic location associated with the merchant needs to be updated when the first geographical location associated with the merchant is determined to be incorrect based on current location information of the user device not matching with a current location of the merchant;
send, to a merchant application running on a merchant device and communicatively coupled to the one or more processors, a second request for a second geographic location associated with the merchant;
receive, from the merchant application on the merchant device, the second geographic location associated with the merchant, the second geographical location being the current location of the merchant;
determine that a third geographic location associated with the user device is within a threshold distance from the second geographic location associated with the merchant, wherein prior consent has been received from the user for processing cardless payment transactions with the merchant when a location of the user device is within the threshold distance of the merchant device; and
authorize, based on determining that the third geographic location is within the threshold distance, a cardless payment transaction for at least one of a product or a service, between the user device and the merchant device using the financial account.

2. The system of claim 1, wherein the one or more processors are further configured to execute the computer-readable instructions to send, to the user device, data indicating the second geographic location.

3. The system of claim 1, wherein the one or more processors are further configured to execute the computer-readable instructions to:
generate a first threshold distance around the first geographic location;
determine that the third geographic location is outside of the first threshold distance; and
generate a second threshold distance around the second geographic location,
wherein determining that the third geographic location is within the threshold distance comprises determining that the third geographic location is within the second threshold distance.

4. The system of claim 3, wherein the one or more processors are further configured to execute the computer-readable instructions to:
avoid authorizing an initial cardless payment transaction between the user device and the merchant device based at least in part on determining that the third geographic location is outside of the first threshold distance, and
authorize the cardless payment transaction between the user device and the merchant device using the financial account of the user upon determining that the third geographic location is within the second threshold distance.

5. The system of claim 1, wherein the one or more processors are further configured to execute the computer-readable instructions to:
update the first geographical location to indicate that the merchant is associated with the second geographic location.

6. A method comprising:
storing, by one or more computing devices, first data associated with a merchant, the first data indicating at least a first geographic location associated with the merchant;
receiving, by the one or more computing devices and from a user application executed on a first electronic device associated with a user, a first request to receive an update on the first geographic location associated with the merchant, the request being triggered when the first geographical location associated with the merchant is determined to be incorrect based on current location information of the user first electronic device not matching with a current location of the merchant;
sending, by the one or more computing devices and to a merchant application executed on a second electronic device associated with the merchant, a second request to update the first geographic location associated with the merchant;
receiving, by the one or more computing devices and from the merchant application on the second electronic device, second data indicating a second geographic location associated with the merchant, the second geographical location being the current location of the merchant;
determining, by the one or more computing devices, that a third geographic location associated with the first electronic device is within a threshold distance from the second geographic location, wherein the one or more computing devices have received prior consent from the user for processing cardless payment transactions with the merchant when a location of the first electronic device is within the threshold distance of the second electronic device; and
authorizing, by the one or more computing devices, and based at least in part on determining that the third geographic location is within the threshold distance, a cardless payment transaction for at least one of a product or a service, between the first electronic device and the second electronic device.

7. The method of claim 6, further comprising:
storing a financial account associated with the first electronic device,
wherein authorizing the cardless payment transaction uses the financial account of the user.

8. The method of claim 6, further comprising updating the first data associated with the merchant to indicate that the merchant is located at the second geographic location.

9. The method of claim 6, further comprising:
generating a first threshold around the first geographic location;
determining that the third geographic location is outside of the first threshold; and
generating a second threshold around the second geographic location,
wherein determining that the third geographic location is within the threshold distance comprises determining that the third geographic location is within the second threshold.

10. The method of claim 9, further comprising avoiding authorization of the cardless payment transaction between the first electronic device and the second electronic device based at least in part on determining that the third geographic location is outside of the first threshold.

11. The method of claim 6, further comprising:
receiving, from the first electronic device, a third request for third data associated with a plurality of merchants; and
sending, to the first electronic device, the third data associated with the plurality of merchants, the third data indicating at least respective geographic locations associated with the plurality of merchants including the first geographic location associated with the merchant.

12. The method of claim 6, further comprising sending, to the first electronic device, third data indicating the second geographic location.

13. An electronic device comprising:
a display device;
memory having computer-readable instructions stored therein; and
one or more processors configured to execute the computer-readable instructions to:
send, to one or more computing devices, a first request for first data associated with a merchant;
receive the first data from the one or more computing devices, the first data indicating at least a first geographic location associated with a merchant device of the merchant;
present, using the display device, an indication that a second geographic location associated with the electronic device is outside of a threshold distance from the first geographic location;
send, to the one or more computing devices, a second request to update the first geographic location associated with the merchant, the second request being triggered when the first geographical location associated with the merchant is determined to be incorrect based on current location information of the electronic device not matching with a current location of the merchant device;
receive, from the one or more computing devices, second data indicating a third geographic location associated with the merchant, the third geographical location being the current location of the merchant; and
present, using the display device, an indication associated with conducting a cardless payment transaction with the merchant based at least in part on the second geographic location being within the threshold distance from the third geographic location, wherein a prior consent has been given to the one or more computing devices for processing cardless payment transactions for at least one of a product or a service, with the merchant when a location of the electronic device is within the threshold distance of the merchant.

14. The electronic device of claim 13, wherein the one or more processors are further configured to execute the computer-readable instructions to avoid presenting the indication based at least in part on the second geographic location being outside of the threshold distance from the first geographic location.

15. The electronic device of claim 13, wherein the one or more processors are further configured to execute the computer-readable instructions to:
present a list of merchants using the display device, the list of merchants including at least the merchant and one additional merchant; and
receive an input selecting the merchant from the list of merchants.

16. The electronic device of claim 13, wherein the one or more processors are further configured to execute the computer-readable instructions to present, using the display device, an option to request the update to the first geographic location associated with the merchant.

17. The electronic device of claim 13, wherein the indication associated with conducting the cardless payment transaction comprises an option to check-in with the merchant.

18. The electronic device of claim 13, wherein:
the first geographic location includes a first address associated with the merchant; and
the third geographic location includes a second address associated with the merchant, the second address including a different address that the first address.

* * * * *